(12) United States Patent
Toyama et al.

(10) Patent No.: US 7,754,325 B2
(45) Date of Patent: Jul. 13, 2010

(54) RUBBER-MODIFIED STYRENE-BASED RESIN AND LIGHT DIFFUSION PLATE CONTAINING SUCH RESIN

(75) Inventors: Mitsutoshi Toyama, Tokyo (JP); Shinichi Nakayama, Tokyo (JP)

(73) Assignee: PS Japan Corporation, Tokyo (JP)

( * ) Notice: Subject to any disclaimer, the term of this patent is extended or adjusted under 35 U.S.C. 154(b) by 8 days.

(21) Appl. No.: 12/087,867

(22) PCT Filed: Jan. 30, 2007

(86) PCT No.: PCT/JP2007/051477

§ 371 (c)(1),
(2), (4) Date: Jul. 16, 2008

(87) PCT Pub. No.: WO2007/088844

PCT Pub. Date: Aug. 9, 2007

(65) Prior Publication Data

US 2009/0239985 A1  Sep. 24, 2009

(30) Foreign Application Priority Data

Jan. 31, 2006  (JP) .............................. 2006-022600

(51) Int. Cl.
*C08L 25/06* (2006.01)

(52) U.S. Cl. .................. 428/327; 428/221; 428/339; 525/191; 525/197; 525/232; 525/241

(58) Field of Classification Search .................. 525/70, 525/89, 95, 98, 191, 197, 232, 241; 428/221, 428/327, 339
See application file for complete search history.

(56) References Cited

FOREIGN PATENT DOCUMENTS

| JP | 60-21662 B2 | 5/1985 |
|---|---|---|
| JP | 60-139758 A | 7/1985 |
| JP | 2512544 B2 | 4/1996 |
| JP | 8-198976 A | 8/1996 |
| JP | 11-060966 A | 3/1999 |
| JP | 2000-296581 A | 10/2000 |
| JP | 2003-002937 A | 1/2003 |
| JP | 2004-50607 A | 2/2004 |
| JP | 2004-090626 A | 3/2004 |

OTHER PUBLICATIONS

Machine Translation of JP 2003-002937 [online], accessed via the Internet [retrieved on Sep. 14, 2009], URL: <http://www19.ipdl.inpit.go.jp/PA1/cgi-bin/PA1INIT?1241803069748>.*

* cited by examiner

*Primary Examiner*—David Wu
*Assistant Examiner*—Robert Jones, Jr.
(74) *Attorney, Agent, or Firm*—Birch, Stewart, Kolasch & Birch, LLP

(57) ABSTRACT

Disclosed is a rubber-modified styrene-based resin comprising a styrene-based polymer forming a matrix and rubber-like polymer particles dispersed in the matrix like islands, each of the rubber-like polymer particles having a cross sectional structure where the styrene-based polymer particles are contained like islands-sea, wherein the rubber-modified styrene-based resin is constituted of 1-10 wt % of the rubber-like polymer and 99-90 wt % of the styrene-based polymer; the particle-diameter of the rubber-like polymer particle falls within a range of 1.0 to 5.0 μm; and a value of (styrene-based polymer weight/rubber-like polymer weight) in a methylethylketone-insoluble matter of the rubber-modified styrene-based resin falls within a range of 0.5 to 1.5.

4 Claims, 1 Drawing Sheet

SCHEMATIC VIEW OF ISLANDS-SEA STRUCTURE

RUBBER-MODIFIED STYRENE-BASED RESIN AND LIGHT DIFFUSION PLATE CONTAINING SUCH RESIN

TECHNICAL FIELD

The present invention relates to a rubber-modified styrene-based resin exhibiting low moisture absorbency and low yellow index of transmitted light and excellent in light diffusibility, light transmissivity and impact resistance, and also relates to a light-diffusion plate containing the resin.

BACKGROUND ART

Lens, lighting covers, personal computer parts and display parts have mostly employed a methacrylic resin having advantage of excellent optical features.

Recently, liquid crystal displays and liquid crystal televisions have grown in size as they are widely used. To prevent warp caused by moisture absorption, a resin such as a methyl methacrylate/styrene copolymer, whose moisture absorption is lower than that of a methacrylic resin, has come to be often used as the material for a light-diffusion plate of a backlight. Indeed, the degree of warp caused by moisture absorption is reduced by reducing moisture adsorption but the reduction level is not sufficient. Then, polystyrene exhibiting much lower moisture absorption has come to be used.

As a method for imparting light diffusibility to a transparent resin, an approach of blending fine particles having different refractive indexes with the transparent resin has been disclosed from long ago. For example, mention may be made of a technique for blending 1-10 μm fine particles (Patent Document 1); a technique for blending 10-50 μm fine particles (Patent Document 2); a technique for blending 1-6 μm silicone resin fine particles in combination with 1-7 μm inorganic fine powder (Patent Document 3); a technique for blending crosslinked-resin fine particles of less than 5 μm in combination with crosslinked-resin fine particles of 5-10 μm (Patent Document 4); and a technique for blending a 1-20 μm light diffusing agent (Patent Document 5). However, these fine particles, regardless of whether they are organic or nonorganic, have a problem of low affinity with the resin, decreasing impact resistance.

To improve impact resistance, a technique for adding an acrylic multi-layer polymer is disclosed (Patent Documents 6 to 8). However, since the multi-layer polymer particles, which are produced by emulsion polymerization generally have as small a diameter as less than 0.5 μm, the yellow index of the transmitted light is high. For this reason, the multi-layer polymer particles are not preferable.

As the styrene-based resin having impact resistance, a rubber-modified styrene-based resin (impact resistant polystyrene) is known. However, conventional rubber-modified styrene-based resin has a problem in that the yellow index of transmitted light is high. In addition, there is a problem of low diffuse-transmission of light. Patent Document 9 discloses a rubber-modified styrene-based resin having excellent light transmissivity and diffusibility, which is obtained by dispersing particles such that the diameter and the accumulation volume ratio of the particles are allowed to fall within predetermined ranges. By virtue of this technique, light diffusion transmissivity is improved; however, the yellow index of the transmitted light is high. Improvement of the yellow index has been desired.

Patent Document 1: JP-B-60-21662
Patent Document 2: JP-A-60-139758
Patent Document 3: Japanese Patent No. 2512544
Patent Document 4: JP-A-11-60966
Patent Document 5: JP-A-2004-50607
Patent Document 6: JP-A-08-198976
Patent Document 7: JP-A-2000-296581
Patent Document 8: JP-A-2004-90626
Patent Document 9: JP-A-2003-2937

DISCLOSURE OF THE INVENTION

The object of the present invention is to provide a rubber-modified styrene-based resin exhibiting low moisture adsorption and a low yellow index of transmitted light, excellent in light diffusibility, light transmissivity and impact resistance, and suitably used in a backlight part such as a light diffusion plate of a liquid crystal display and a liquid crystal television.

The present inventors have conducted intensive studies, with a view to attaining the aforementioned object, on the structure of reinforcing rubber particles contained in an impact resistant polystyrene resin and a polymerization process for them. As a result, they found that the aforementioned object can be attained by employing a specific structure of the rubber particles.

More specifically, the present invention is concerned with a rubber-modified styrene-based resin including a styrene-based polymer forming a matrix and rubber-like polymer particles dispersed in the matrix like islands, each of the rubber-like polymer particles having a cross sectional structure where the styrene-based polymer particles are contained like islands-sea, in which the rubber-modified styrene-based resin is constituted of 1-10 wt % of the rubber-like polymer and 99-90 wt % of the styrene-based polymer; the particle-diameter of the rubber-like polymer particle falls within the range of 1.0 to 5.0 μm; and a value of (styrene-based polymer weight/rubber-like polymer weight) in a methylethylketone-insoluble matter of the rubber-modified styrene-based resin falls within the range of 0.5 to 1.5. Note that the particle-diameter distribution of the rubber-like polymer particles of the rubber-modified styrene-based resin preferably falls within the range of 1.0 to 1.6. In addition, the swelling index of the toluene-insoluble matter of the rubber-modified styrene-based resin to toluene preferably falls within the range of 5.0 to 10.0. Furthermore, the present invention is concerned with a light diffusion plate including at least one layer formed of the rubber-modified styrene-based resin.

The rubber-modified styrene-based resin of the present invention exhibits a low yellow index of the transmitted light and is excellent in light diffusibility, light transmissivity and impact resistance. The molded article of the resin is suitably used as a light diffusion plate of a liquid crystal display device such as lighting equipment, a light advertising display, a liquid crystal display and a liquid crystal television.

BEST MODE FOR CARRYING OUT THE INVENTION

Now, the present invention will be more specifically explained below.

Examples of a styrene-based monomer composing a styrene-based polymer serving as a matrix of the rubber-modified styrene-based resin of the present invention include styrene, α-methylstyrene, p-methylstyrene and p-t-butylstyrene. These may be used singly or in combination of two or more. Of them, styrene is preferable. If necessary, another monomer, which is co-polymerizable with the styrene monomer, may be used as long as it does not interfere with the object of the present invention. Examples of the co-polymerizable monomer used herein include a vinyl cyanide monomer such as acrylonitrile or methacrylonitrile; a (meth)acrylic acid ester such as methyl(meth)acrylate, ethyl(meth)acrylate or butyl(meth)acrylate; a monomer containing an anhydride group such as maleic anhydride or itaconic acid anhydride; a monomer containing a dicarboxylic acid imido group such as maleimide, N-methylmaleimide, N-phenylmaleimide or N-cyclohexylmaleimide; and a monomer containing a carboxyl group such as acrylic acid, methacrylic acid, maleic acid or itaconic acid.

The amount of co-polymerizable monomer with the styrene-based monomer and serving as a monomer composing the matrix is preferably 25 parts by weight or less, and more preferably, 10 parts by weight or less.

The rubber-modified styrene-based resin of the present invention has the structure shown in FIG. 1. Reference numeral 1 of FIG. 1 indicates a styrene-based polymer serving as a matrix. Reference numeral 2 indicates rubber-like polymer (particles) dispersed in the matrix. Reference numeral 3 indicates styrene-based polymer contained in the rubber-like polymer. The rubber-like polymer particles forming a dispersed phase of the rubber-modified styrene-based resin of the present invention are dispersed like islands in the matrix. In the cross section of the rubber-like polymer particle, a islands-sea structure is observed containing the styrene-based polymer (particles). The styrene-based polymer (particles) contained preferably have quite-small and uniform particle diameters.

The rubber-like polymer forming the rubber-like polymer particles are polybutadiene rubber (low-cis polybutadiene, high-cis polybutadiene), styrene-butadiene copolymer (random and block styrene-butadiene copolymer (SBR)), more preferably, polybutadiene rubber, and particularly preferably, low-cis polybutadiene. The content of the styrene polymer in the styrene-butadiene copolymer is preferably 25 wt % or less, and more preferably, 10 wt % or less. When the content of the styrene polymer in the styrene-butadiene copolymer increases, the refractive index of the copolymer comes closer to that of the matrix, with the result that the diffusibility is likely to decrease.

The rubber-modified styrene-based resin of the present invention is composed of the rubber-like polymer within 1 to 10 wt % and the styrene-based polymer within 99 to 90 wt %, preferably the rubber-like polymer within 2 to 10 wt % and the styrene-based polymer within 98 to 90 wt %, and more preferably, the rubber-like polymer within 3 to 9 wt % and the styrene-based polymer within 97 to 91 wt %. When the content of the rubber-like polymer is less than 1 wt %, impact resistance and light diffusibility decrease. When the content exceeds 10 wt %, rigidity and light transmissivity decrease.

The diameters of the rubber-like polymer particles dispersed in the rubber-modified styrene-based resin falls within 1.0 to 5.0 μm, and preferably, 1.2 to 4.0 μm, and more preferably, 1.3 to 3.5 μm. In the case where the particle diameter is less than 1.0 μm, the diffusibility decreases. In the case where such a resin is used as a light diffusion plate, a light source is easily seen through the plate; at the same time, the yellow index of the transmitted light increases and, in addition, impact resistance becomes poor. On the other hand, in the case where the particle diameter exceeds 5.0 μm, a large amount of rubber-like polymer dispersion particles is required to satisfactorily attain high light diffusibility. As a result, rigidity decreases, and thus, this case is not preferable. In addition, it becomes difficult to decrease the ratio of (styrene-based polymer weight/rubber-like polymer weight) in the methylethylketone-insoluble matter, increasing the yellow index of the transmitted light. Also in this aspect, this case is not preferable.

The particle-diameter distribution, which is obtained by the ratio of the volume-based median diameter relative to the number based median diameter of the dispersion particles, preferably fall within the range of 1.0 to 1.6, and more preferably, 1.0 to 1.5. When the particle-diameter distribution exceeds 1.6, the yellow index of the transmitted light is likely to increase.

The value of (styrene-based polymer weight/rubber-like polymer weight) in the methylethylketone-insoluble matter of rubber-modified styrene-based resin falls within the range of 0.5 to 1.5, preferably 0.6 to 1.4, and more preferably, 0.7 to 1.3. The case where the value of (styrene-based polymer weight/rubber-like polymer weight) is less than 0.5 is not preferable, since impact resistance decreases. On the other hand, the case where the value of (styrene-based polymer weight/rubber-like polymer weight) exceeds 1.5 is not preferable, since the yellow index of the transmitted light increases. When the resin of the latter case is used as a light diffusion plate, it is difficult to control the color of the plate and thus not preferable. In addition, the higher the value of (styrene-based polymer weight/rubber-like polymer weight), the lower the diffusibility.

Measurement of the content of the dispersion phase (gel content) of the rubber-modified styrene-based resin can be performed by dissolving the resin in a solvent, centrifuging the solution, separating insoluble matter (dispersion phase) from soluble matter by decantation and drying the insoluble matter. Generally, toluene is used as the solvent. However, when toluene is used in the case of the rubber-modified styrene-based resin having small-diameter particles dispersed therein or containing a rubber-like polymer of a low cross-linking degree, the gel content flows out by decantation during the measurement operation due to high affinity of toluene with the gel content. As a result, the content of the dispersion phase becomes sometimes lower than the actual value. For this reason, methylethylketone is used in the present invention. When methylethylketone is used, the content of the dispersion phase can be measured without flow-out of the gel content by decantation.

The swelling index of the toluene-insoluble matter of the rubber-modified styrene-based resin to toluene preferably fall within the range of 5.0 to 10.0, more preferably 6.0 to 9.0, and further preferably, 6.0 to 8.0. The swelling index represents the crosslink density of the rubber-like polymer. The smaller the numerical value of the index, the higher the crosslink density. The larger the numerical value, the lower the crosslink density. As the swelling index becomes smaller, the strength of the rubber-modified styrene-based resin is likely to decrease. On the other hand, as the swelling index becomes larger, the dispersed particles are easily distorted by orientation during a fabrication process, with the result that diffusibility is likely to decrease.

The methylethylketone-insoluble matter (gel) of the rubber-modified styrene-based resin preferably fall within the range of 3 to 25 wt %, more preferably, 4 to 23 wt %, and further preferably, 6 to 20 wt %. As the methylethylketone-insoluble gel content decreases, the light diffusibility is likely to decrease. As methylethylketone-insoluble gel content increases, the light transmissivity is likely to decrease.

A process for producing a rubber-modified styrene-based resin according to the present invention will be described.

As a polymerization process for the rubber-modified styrene-based resin of the present invention, mention may be made of mass polymerization, solution polymerization and mass-suspension polymerization. Of them, mass polymerization or solution polymerization is preferable. Furthermore, continuous mass polymerization or continuous solution polymerization is particularly preferable in view of productivity and economy. More specifically, a first-flow polymerization solution is prepared by subjecting a polymerization solution, which contains a rubber-like polymer, styrene-based monomer, another optional monomer co-polymerizable with the styrene-based monomer, a solvent, a polymerization initiator and a chain transfer agent, to polymerization while suppressing the progress of polymerization to the extent that the rubber-like polymer is not granulated. A second-flow polymerization solution is prepared by adding a styrene-based monomer, another optional monomer co-polymerizable with the styrene-based monomer, a solvent, a polymerization initiator and a chain transfer agent and placed under polymerization. Then, the first-flow polymerization solution and the second-flow polymerization solution are continuously mixed with each other while stirring by applying high shearing force. After granulation is forcibly performed by mixing while stirring, the polymerization is further allowed to proceed. The polymerization mixture is introduced into a recovery apparatus, in which the solvent and unreacted monomers are removed by vaporization with heat to obtain a rubber-modified styrene-based resin. The recovery apparatus is a unit customarily used in producing a styrene-based resin. For example, a flash-tank system and an extruder equipped with a multi-stage vent can be used.

The diameter of the rubber-like polymer particles can be regulated by controlling, for example, the rotation number (shearing force) of a mixer/stirrer for continuously mixing the first-flow polymerization solution and the second-flow polymerization solution by application of high shearing force, the ratio of polymerization of the first-flow polymerization solution, and the molecular weight of the styrene-based polymer contained in the first-flow polymerization solution. The value of (styrene-based polymer weight/rubber-like polymer weight) in the methylethylketone-insoluble matter can be regulated by controlling, for example, the amount of rubber-like polymer contained in the first-flow polymerization solution, a mixing ratio of the first-flow polymerization solution to the second-flow polymerization solution, the amount of styrene-based polymer contained in the solution mixture and the rotation number of the mixer/stirrer.

The swelling index of the toluene-insoluble matter to toluene can be regulated by, for example, controlling the temperature of the recovery system.

In the aforementioned production process, the amount of rubber-like polymer contained in the first-flow polymerization solution is preferably 6 wt % or more, and more preferably, 8 wt % or more. The amount of polymerization initiator contained in the polymerization solution is 100 to 1000 ppm, and more preferably, 300 to 800 ppm. The mixing ratio of the first-flow polymerization solution to the second-flow polymerization solution is preferably 1:1 to 3:7. The amount of styrene-based polymer contained in the solution mixture is preferably 24 to 45 wt %. Furthermore, it is preferred that the first-flow polymerization solution and second-flow polymerization solution are continuously mixed while stirring by application of higher shearing force.

A light transmissible molded article formed of a rubber-reinforced styrene-based resin produced by the same process is disclosed in JP-A-2003-2937. Since the mixing ratio of a first-flow polymerization solution to a second-flow polymerization solution shown in the Examples is 2:1 and the content of the styrene-based polymer contained in the solution mixture is low, the molded article produced by this process cannot satisfy the value of (styrene-based polymer weight/rubber-like polymer weight) in the methylethylketone-insoluble matter of the rubber-modified styrene-based resin of the present invention. In addition, a conventional method in which a styrene-based polymer is polymerized in the presence of a rubber-like polymer to granulate the rubber-like polymer or a conventional method in which a styrene-based polymer is added in order to accelerate granulation fail to provide a rubber-modified styrene-based resin according to the present invention.

The amount of rubber-like polymer contained in the rubber-modified styrene-based resin can be controlled by regulating the content of the rubber-like polymer in a raw material so as to satisfy a desired amount and by regulating the polymerization ratio of the rubber-like polymer. The rubber-modified styrene-based resin of the present invention can be produced by the aforementioned production process; however, can be produced by another process in which a styrene-based resin such as polystyrene resin containing no rubber-like polymer is mixed with the rubber-modified styrene-based resin obtained by the aforementioned production process. When the rubber-modified styrene-based resin is produced by the aforementioned method, the amount of rubber-like polymer contained in the rubber-modified styrene-based resin is preferably 4 to 10 wt %, more preferably, 4 to 9 wt %, and further preferably, 5 to 9 wt %. When the amount of rubber-like polymer is less than 4 wt %, the value of (styrene-based polymer weight/rubber-like polymer weight) in the methylethylketone-insoluble matter is likely to increase. When the amount of rubber-like polymer exceeds 10 wt %, the viscosity of the first-flow polymerization solution increases. As a result, it becomes difficult to feed the solution.

Examples of an organic peroxide serving as a polymerization initiator include peroxyketals, dialkylperoxides, diacylperoxides, peroxydicarbonates, peroxyesters, ketoneperoxides and hydroperoxides.

Examples of a polymerization solvent that can be used may include ethylbenzene, toluene and xylene.

In any time point before or after the recovery step of the production process for the rubber-modified styrene-based resin of the present invention, or in a step of extruding and molding the rubber-modified styrene-based resin, various additives such as an ultraviolet absorber, a light stabilizer, hindered phenolic, phosphorus or sulfuric antioxidant, a lubricant, an antistatic agent, a flame retardant, various dyes and pigments, a fluorescent whitening agent and a light absorber (absorbing light of a specific-wavelength) may be optionally added as long as the object of the present invention is not interfered with.

In the present invention, to prevent staining by ultraviolet rays generated from a light source lamp, an ultraviolet absorber and a light stabilizer may be added to the rubber-modified styrene-based resin of the present invention. Examples of the ultraviolet absorber include a benzotriazole based ultraviolet absorber such as 2-(5-methyl-2-hydroxyphenyl)benzotriazole, 2-[2-hydroxy-3,5bis(α-α'dimethylbenzyl)phenyl]benzotriazole or 2-(3,5-di-t-amyl-2-hydroxyphenyl)benzotriazole; a benzophenone based ultraviolet absorber such as 2-hydroxy-4-methoxybenzophenone, 2,2'-dihydroxy-4-methoxybenzophenone or 2-hydroxy-4-n-octoxybenzophenone; a salicylic acid based ultraviolet absorber such as phenyl salicylate or 4-t-butylphenyl salicylate; a 2-(1-arylalkydene)malonic acid ester based ultraviolet absorber; and an oxalanilide based ultraviolet absorber. Examples of the light stabilizer include a hindered amine based light stabilizer. Examples of the hindered amine based light stabilizer include bis(2,2,6,6-tetramethyl-4-piperidyl)sebacate and N,N'-bis(3-aminopropyl)ethylenediamine-2,4-bis[N-butyl-N-(1,2,2,6,6-pentamethyl-4-piperidyl)amino]-6-chloro-1,3,5-triazine condensate. The ultraviolet absorber and light stabilizer each may be used singly or in a combination of two or more. The addition amount, i.e., the total addition amount of ultraviolet absorber and light stabilizer, is preferably 0.02 to 2.0 parts by weight relative to the rubber-modified styrene-based resin (100 parts by weight), and more preferably, 0.1 to 1.5 parts by weight.

Furthermore, a masking agent such as a fluorescent whitening agent and bluing agent may be optionally added to the rubber-modified styrene-based resin of the present invention.

A method of adding the additives to the rubber-modified styrene-based resin of the present invention may be selected from known methods. For example, the rubber-modified styrene-based resin, additives and optionally a styrene-based resin containing no rubber-like polymer are mixed by a Henschel mixer or a tumbler, and thereafter, molten and kneaded in a single or double screw extruder and various types of kneaders to obtain a molded composition in the pellet or plate form.

The rubber-modified styrene-based resin of the present invention can be molded into various types of molded articles by means of extrusion molding, injection molding and compression molding, and suitably used in lighting equipment, light advertising display, liquid crystal devices such as a liquid crystal display and liquid crystal television. Of them, the rubber-modified styrene-based resin of the present invention is suitably used as a direct-type backlight-diffusion plate of a liquid crystal device.

EXAMPLES

The present invention will be more specifically explained below; however, the present invention is not limited by these examples.

Note that the following measurement methods and evaluation methods were employed in the present invention.

(1) Dispersion-Particle Diameter, Particle-Diameter Distribution

Using COULTER MULTISIZER II (trade name) manufactured by Beckmann Coulter, Inc. and equipped with an aperture tube of 30 μm in diameter, 2 to 5 rubber-modified styrene-based resin pellets were placed in about 5 ml of dimethylformamide and allowed to stand still for about 2 to 5 minutes. Next, the dissolved matter in dimethylformamide was measured as a proper particle concentration and the volume-based median diameter was obtained. The number-based median diameter was simultaneously measured with the volume-based median diameter. The particle-diameter distribution was obtained from volume-based median diameter/number based median diameter.

(2) Rubber-Like Polymer Content (wt %)

Rubber-modified styrene-based resin (0.25 g) was dissolved in 50 ml of chloroform. To the mixture, iodine monochloride was added. After the double bonds of the rubber component were allowed to react, potassium iodide was added to convert the remaining iodine monochloride into iodide, which was reversely titrated by sodium thiosulfate in accordance with the iodine monochloride method. In this manner, the content of the rubber-like polymer in the rubber-modified styrene-based resin was measured.

(3) Methylethylketone-Insoluble Matter (wt %)

Rubber-modified styrene-based resin (1 g) was weighed (W1). To this, methylethylketone (20 ml) was added, shook at 23° C. for 2 hours, and then, separated by a centrifuge manufactured by Hitachi Corporation (himac (trade name) CR-20 (roter:R20A2)) at 10° C. or less at 20000 rpm for 60 minutes. The supernatant liquid was removed by decantation to obtain insoluble matter. Subsequently, vacuum dry was performed under conditions of 160° C., 20 mmHg or less, for 60 minutes. After cooled in a desiccator to room temperature, the resultant insoluble matter was weighed (W2). The methylethylketone-insoluble matter was obtained in accordance with the following equation:

Methylethylketone-insoluble matter (wt %)=($W2$/$W1$)×100

(4) Swelling Index to Toluene

Rubber-modified styrene-based resin (1 g) was weighed (W3). To this, toluene (20 ml) was added, shook at 23° C. for 2 hours, and then, separated by a centrifuge manufactured by Hitachi Corporation (himac (trade name) CR-20 (roter: R20A2)) at 10° C. or less at 20000 rpm for 60 minutes. The supernatant liquid was removed by decantation to obtain insoluble matter. The weight of the insoluble matter containing toluene was weighed (W4). Subsequently, vacuum dry was performed under conditions of 160° C., 20 mmHg or less, for 60 minutes. After cooled in a desiccator to room temperature, the resultant insoluble matter was weighed (W5). The swelling index to toluene was obtained in accordance with the following equation:

The swelling index to toluene=$W4/W5$ (5) PS/Ru Ratio (Styrene-Based Polymer Weight/Rubber-Like Polymer Weight) in Dispersion Phase The PS/Ru ratio of the dispersion phase in a rubber-modified styrene-based resin was obtained in accordance with the following equation.

$PS/Ru$ ratio of the dispersion phase=(methylethylketone-insoluble matter−rubber-like polymer content)/rubber-like polymer content.

(6) Charpy Impact Strength

Charpy impact strength was measured in accordance with ISO 179.

(7) Total Luminous Transmittance, Yellow Index

Total luminous transmittance was measured by color difference turbidity measuring instrument COH300A (trade name) manufactured by Nippon Denshoku Industries Co., Ltd. in accordance with JIS K7105. At the same time, yellow index was measured.

(8) Diffusion Rate

Using a goniophotometer manufactured by Optec Co., Ltd., a white light source is directly applied to a test piece such that light is incident upon the test piece at the right angle. The brightness of the transmitted light on the side opposite to light incident side within the angle range of 0° to 70° was measured. The diffusion rate was calculated in accordance with the following equation.

Light diffusion rate (%)=(brightness at 20°+brightness at 70°)÷(brightness at 5°×2)×100

Rubber-modified styrene-based resins used in Examples and Comparative Examples were produced by the following methods.

(Production of Rubber-Modified Styrene-Based Resin H1)

To a tower reactor (a first reactor) of 1.8 L in volume equipped with a stirrer and a jacket, the following polymerization solution (a) was continuously fed as a first flow at a rate of 1.5 L/Hr.

A low-cis polybutadiene rubber, 5 wt % styrene solution of which has a viscosity (25° C.) of 35 centi poise, was used as a rubber-like polymer to prepare the polymerization solution (a) having the following composition.

| Polymerization solution (a) | |
|---|---|
| Rubber-like polymer | 12.5 parts by weight |
| Styrene | 74.5 parts by weight |
| Ethylbenzene | 13.0 parts by weight |
| α-methylstyrene dimer | 0.26 parts by weight |
| 1,1-bis(t-butylperoxy)cyclohexane | 0.05 parts by weight |
| Di-t-butylperoxide | 0.02 parts by weight |

The stirring number of the first reactor was set at 100 rpm and the temperature thereof was controlled at 104° C. The solid-matter concentration at the outlet of the first reactor was 21.0 wt %. To a tower reactor (a second reactor) of 6.2 L in volume equipped with a stirrer and a jacket, the following polymerization solution (b) was continuously fed as a second-flow at a rate of 1.5 L/Hr.

| Polymer solution (b) | |
|---|---|
| Styrene | 95.0 parts by weight |
| Ethylbenzene | 5.0 parts by weight |
| 1,1-bis(t-butylperoxy)cyclohexane | 0.01 part by weight |

The stirring number of the second reactor was set at 110 rpm and the temperature thereof was controlled at 123 to 132° C. The solid-matter concentration at the outlet of the second reactor was 45.2 wt %. The first-flow and the second-flow were introduced into a stirrer/mixer (a volume: 0.5 L, the clearance between the tips of stirring blades and the wall of the mixer: 2 mm) equipped with a stirring rod having stirring blades of 19 stages in the shaft direction and having pins on the wall of the mixer so as to fit to the intervals between the blades. These flows were mixed at a stirring number of 400 rpm. Subsequently, the mixture was fed to a tower reactor (a third reactor) of 6.2 L in volume equipped with a stirrer and a jacket. Polymerization was performed at a temperature of 118 to 123° C. for 2.1 hours. The mixture was further fed to a tower reactor (a fourth reactor) of 6.2 L in volume equipped with a stirrer and a jacket. Polymerization was performed at a temperature of 120 to 130° C. for 2.1 hours. The obtained polymerization solution was continuously supplied to an extruder equipped with a two-stage vent for vaporization to recover unreacted monomers and the solvent by setting the temperature of the extruder at 240° C. and the degree of vacuum of the first-stage vent and the second-stage vent at 25 torr and obtain rubber-modified styrene-based resin H1.

(Production of Rubber-Modified Styrene-Based Resin H2)

To a tower reactor (a first reactor) of 1.8 L in volume equipped with a stirrer and a jacket, the following polymerization solution (a) was continuously fed as a first-flow at a rate of 1.5 L/Hr.

A low-cis polybutadiene rubber, 5 wt % styrene solution of which has a viscosity (25° C.) of 35 centi poise, was used as a rubber-like polymer to prepare the polymerization solution (a) having the following composition.

| Polymerization solution (a) | |
| --- | --- |
| Rubber-like polymer | 11.5 parts by weight |
| Styrene | 75.5 parts by weight |
| Ethylbenzene | 13.0 parts by weight |
| α-methylstyrene dimer | 0.66 parts by weight |
| 1,1-bis(t-butylperoxy)cyclohexane | 0.05 parts by weight |
| Di-t-butylperoxide | 0.01 part by weight |

The stirring number of the first reactor was set at 100 rpm and the temperature thereof was controlled at 108° C. The solid-matter concentration at the outlet of the first reactor was 22.0 wt %. To a tower reactor (a second reactor) of 6.2 L in volume equipped with a stirrer and a jacket, the following polymerization solution (b) was continuously fed as a second-flow at a rate of 1.5 L/Hr.

| Polymer solution (b) | |
| --- | --- |
| Styrene | 95.0 parts by weight |
| Ethylbenzene | 5.0 parts by weight |
| 1,1-bis(t-butylperoxy)cyclohexane | 0.01 part by weight |

The stirring number of the second reactor was set at 110 rpm and the temperature thereof was controlled at 123 to 132° C. The solid-matter concentration at the outlet of the second reactor was 45.1 wt %. After the process performed in the stirrer/mixer, the same procedure as in the case of rubber-modified styrene-based resin H1 was repeated except that the temperature of the third reactor was set at 117 to 123° C. and the temperature of the fourth reactor was set at 123 to 133° C. to obtain rubber-modified styrene-based resin H2.

(Production of Rubber-Modified Styrene-Based Resin H3)

To a tower reactor (a first reactor) of 1.8 L in volume equipped with a stirrer and a jacket, the following polymerization solution (a) was continuously fed as a first flow at a rate of 1.2 L/Hr.

A low-cis polybutadiene rubber, 5 wt % styrene solution of which has a viscosity (25° C.) of 95 centi poise, was used as a rubber-like polymer to prepare the polymerization solution (a) having the following composition.

| Polymerization solution (a) | |
| --- | --- |
| Rubber-like polymer | 10.1 parts by weight |
| Styrene | 74.9 parts by weight |
| Ethylbenzene | 15.0 parts by weight |
| α-methylstyrene dimer | 0.325 parts by weight |
| 1,1-bis(t-butylperoxy)cyclohexane | 0.05 parts by weight |
| Di-t-butylperoxide | 0.025 parts by weight |

The stirring number of the first reactor was set at 100 rpm and the temperature thereof was controlled at 98° C. The solid-matter concentration at the outlet of the first reactor was 15.3 wt %. To a tower reactor (a second reactor) of 6.2 L in volume equipped with a stirrer and a jacket, the following polymerization solution (b) was continuously fed as a second flow at a rate of 1.8 L/Hr.

| Polymer solution (b) | |
| --- | --- |
| Styrene | 95.0 parts by weight |
| Ethylbenzene | 5.0 parts by weight |
| 1,1-bis(t-butylperoxy)cyclohexane | 0.01 part by weight |

The stirring number of the second reactor was set at 110 rpm and the temperature thereof was controlled at 126 to 136° C. The solid-matter concentration at the outlet of the second reactor was 44.9 wt %. The first-flow and the second-flow were introduced into a stirrer/mixer (a volume: 0.5 L, the clearance between the tips of stirring blades and the wall of the mixer: 2 mm) equipped with a stirring rod having stirring blades of 19 stages in the shaft direction and having pins on the wall of the mixer so as to fit to the intervals between the blades. These flows were mixed at a stirring number of 400 rpm. Subsequently, the mixture was fed into a tower reactor (a third reactor) of 6.2 L in volume equipped with a stirrer and a jacket. Polymerization was performed at a temperature of 120 to 126° C. for 2.1 hours. The mixture was further fed to a tower reactor (a fourth reactor) of 6.2 L in volume equipped with a stirrer and a jacket. Polymerization was performed at a temperature of 127 to 137° C. for 2.1 hours. The obtained polymerization solution was continuously supplied to an extruder equipped with a two-stage vent for vaporization to recover unreacted monomers and the solvent by setting the temperature of an extruder at 240° C. and the degree of vacuum of the first-stage vent and the second-stage vent at 25 torr and obtain rubber-modified styrene-based resin H3.

(Production of Rubber-Modified Styrene-Based Resin H4)

The same operation was repeated in the same manner as in the case of rubber-modified styrene-based resin H1 except that the temperature of the extruder was set at 210° C. to obtain rubber-modified styrene-based resin H4.

(Production of Rubber-Modified Styrene-Based Resin H5)

A low-cis polybutadiene rubber, 5 wt % styrene solution of which has a viscosity (25° C.) of 170 centi poise, was used as a rubber-like polymer to prepare the polymerization solution (a) having the following composition.

| Polymerization solution (a) | |
| --- | --- |
| Rubber-like polymer | 3.4 parts by weight |
| Styrene | 86.1 parts by weight |
| Ethylbenzene | 10.5 parts by weight |
| α-methylstyrene dimer | 0.055 parts by weight |
| 1,1-bis(t-butylperoxy)cyclohexane | 0.005 parts by weight |
| Di-t-butylperoxide | 0.01 part by weight |

The polymerization solution was continuously supplied to a polymerization apparatus formed of 3 tower reactors equipped with a stirrer (each having an inner volume of 6.2 L) and connected in series, at a rate of 2.4 L/hr. The stirring number of the first reactor was set at 90 rpm. Polymerization was performed in the first reaction at 122 to 131° C. for 2.6 hours, in the second reactor at 135 to 145° C. for 2.6 hours and in the third reactor at 145 to 155° C. for 2.6 hours. The obtained polymerization solution was continuously supplied to an extruder equipped with a two-stage vent for vaporization to recover unreacted monomers and the solvent by setting the temperature of the extruder at 230° C. and the degree of vacuum of the first-stage vent and the second-stage vent at 25 torr and obtain rubber-modified styrene-based resin H5.

(Production of Rubber-Modified Styrene-Based Resin H6)

To a tower reactor (a first reactor) of 2.4 L in volume equipped with a stirrer and a jacket, the following polymerization solution (a) was continuously fed as a first flow at a rate of 2.0 L/Hr. A low-cis polybutadiene rubber, 5 wt % styrene solution of which has a viscosity (25° C.) of 35 centi poise, was used as a rubber-like polymer to prepare the polymerization solution (a) having the following composition.

| Polymerization solution (a) | |
| --- | --- |
| Polybutadiene rubber | 9.6 parts by weight |
| Styrene | 75.4 parts by weight |
| Ethylbenzene | 15.0 parts by weight |
| α-methylstyrene dimer | 0.075 parts by weight |
| 1,1-bis(t-butylperoxy)cyclohexane | 0.075 parts by weight |

The stirring number of the first reactor was set at 100 rpm and the temperature thereof was controlled at 97° C. The solid-matter concentration at the outlet of the first reactor was 16.0 wt %. To a tower reactor (a second reactor) of 6.2 L in volume equipped with a stirrer and a jacket, the following polymerization solution (b) was continuously fed as a second flow at a rate of 1.0 L/Hr.

| Polymer solution (b) | |
| --- | --- |
| Styrene | 89.7 parts by weight |
| Ethylbenzene | 10.3 parts by weight |

The stirring number of the second reactor was set at 110 rpm and the temperature thereof was controlled at 130 to 140° C. The solid-matter concentration at the outlet of the second reactor was 50.0 wt %. The first-flow and the second-flow were introduced into a stirrer/mixer (a volume: 0.5 L, the clearance between the tips of stirring blades and the wall of the mixer: 5 mm) equipped with a stirring rod having stirring blades of 15 stages in the shaft direction and having heat conducting pipes on the wall of the mixer so as to fit to the intervals between the blades. These flows were mixed at a stirring number of 200 rpm. Subsequently, the mixture was fed into a tower reactor (a third reactor) of 6.2 L in volume equipped with a stirrer and a jacket. Polymerization was performed at a temperature of 112 to 120° C. for 2.1 hours. The mixture was further fed to a tower reactor (a fourth reactor) of 6.2 L in volume equipped with a stirrer and a jacket. Polymerization was performed at a temperature of 140 to 155° C. for 2.1 hours. The obtained polymerization solution was continuously supplied to an extruder equipped with a two-stage vent for vaporization to recover unreacted monomers and the solvent by setting the temperature of an extruder at 230° C. and the degree of vacuum of the first-stage vent and the second-stage vent at 25 torr. Operation was performed in accordance with Example 3 of JP-A-2003-2937 to obtain rubber-modified styrene-based resin H6.

(Production of Rubber-Modified Styrene-Based Resin H7)

To a tower reactor (a first reactor) of 1.8 L in volume equipped with a stirrer and a jacket, the following polymerization solution (a) was continuously fed as a first flow at a rate of 2.0 L/Hr. A low-cis polybutadiene rubber, 5 wt % styrene solution of which has a viscosity (25° C.) of 95 centi poise, was used as a rubber-like polymer to prepare the polymerization solution (a) having the following composition.

| Polymerization solution (a) | |
| --- | --- |
| Rubber-like polymer | 6.75 parts by weight |
| Styrene | 81.25 parts by weight |
| Ethylbenzene | 12.0 parts by weight |
| α-methylstyrene dimer | 0.29 parts by weight |
| 1,1-bis(t-butylperoxy)cyclohexane | 0.045 parts by weight |

The stirring number of the first reactor was set at 80 rpm and the temperature thereof was controlled at 104° C. The solid-matter concentration at the outlet of the first reactor was 14.2 wt %. To a tower reactor (a second reactor) of 6.2 L in volume equipped with a stirrer and a jacket, the following polymerization solution (b) was continuously fed as a second flow at a rate of 1.0 L/Hr.

| Polymer solution (b) | |
| --- | --- |
| Styrene | 88.0 parts by weight |
| Ethylbenzene | 12.0 parts by weight |

The stirring number of the second reactor was set at 100 rpm and the temperature thereof was controlled at 122 to 132° C. The solid-matter concentration at the outlet of the second reactor was 38.7 wt %. The first-flow and the second-flow were introduced into a stirrer/mixer (a volume: 0.5 L, the clearance between the tips of stirring blades and the wall of the mixer: 2 mm) equipped with a stirring rod having stirring blades of 19 stages in the shaft direction and having pins on the wall of the mixer so as to fit to the intervals between the blades. These flows were mixed at a stirring number of 300 rpm. Subsequently, the mixture was introduced into a tower reactor (a third reactor) of 6.2 L in volume equipped with a stirrer and a jacket. Polymerization was performed at a temperature of 125 to 135° C. for 2.1 hours. The mixture was further fed to a tower reactor (a fourth reactor) of 6.2 L in volume equipped with a stirrer and a jacket. Polymerization was performed at a temperature of 145 to 155° C. for 2.1 hours. The obtained polymerization solution was continuously supplied to an extruder equipped with a two-stage vent for vaporization to recover unreacted monomers and the solvent by setting the temperature of an extruder at 240° C. and the degree of vacuum of the first-stage vent and the second-stage vent at 25 torr and obtain rubber-modified styrene-based resin H7.

(Production of Rubber-Modified Styrene-Based Resin H8)

To a tower reactor (a first reactor) of 1.8 L in volume equipped with a stirrer and a jacket, the following polymerization solution (a) was continuously fed as a first flow at a rate of 1.5 L/Hr. A low-cis polybutadiene rubber, 5 wt % styrene solution of which has a viscosity (25° C.) of 35 centi poise, was used as a rubber-like polymer to prepare the polymerization solution (a) having the following composition.

| Polymerization solution (a) | |
| --- | --- |
| Rubber-like polymer | 11.5 parts by weight |
| Styrene | 75.5 parts by weight |

-continued

| Polymerization solution (a) | |
|---|---|
| Ethylbenzene | 13.0 parts by weight |
| α-methylstyrene dimer | 0.16 parts by weight |
| 1,1-bis(t-butylperoxy)cyclohexane | 0.03 parts by weight |

The stirring number of the first reactor was set at 100 rpm and the temperature thereof was controlled at 103° C. The solid-matter concentration at the outlet of the first reactor was 18.2 wt %. To a tower reactor (a second reactor) of 6.2 L in volume equipped with a stirrer and a jacket, the following polymerization solution (b) was continuously fed as a second flow at a rate of 1.5 L/Hr.

| Polymer solution (b) | |
|---|---|
| Styrene | 95.0 parts by weight |
| Ethylbenzene | 5.0 parts by weight |
| 1,1-bis(t-butylperoxy)cyclohexane | 0.01 part by weight |

The stirring number of the second reactor was set at 110 rpm and the temperature thereof was controlled at 123 to 132° C. The solid-matter concentration at the outlet of the second reactor was 44.8 wt %. After the process performed in the stirrer/mixer, the same procedure as in the case of rubber-modified styrene-based resin H1 was repeated except that the rotation number of the stirrer/mixer was set at 600 rpm, the temperature of the third reactor was set at 125 to 131° C. and the temperature of the fourth reactor was set at 130 to 140° C. to obtain rubber-modified styrene-based resin H8.

(GP Polystyrene Resin G1)

Use was made of GP polystyrene having a weight average molecular weight (Mw) of 312000 and a number average molecular weight (Mn) of 117000, a molecular-weight distribution (Mw/Mn) of 2.7 and MFR (200° C.-5 kg) of 1.5 g/10 min.

(Diffusing Agent K1)

Use was made of crosslinked polymethylmethacrylate particles (manufactured by Sekisui Chemical Co., Ltd. Trade Name: Techpolymer MBX-5, refractive index: 1.49. weight average particle diameter: 5 μm).

The resins used in Examples 1 to 5 and Comparative Examples 1 to 8 and measurement methods will be described. In Examples 1 to 3 and Comparative Examples 1, 3 to 5, pellets of rubber-modified styrene-based resins H1 to H3, H5 to H8 were used. In Examples 4 and 5, Comparative Examples 2, 6 to 8, use was made of pellets obtained by melting and kneading the resin compositions shown in Table 1 and 2 by double screw extruder of 30 mm. The obtained pellets (excluding Comparative Example 8) were measured for rubber-like polymer content, the diameter of dispersion-particles, particle-diameter distribution, methylethylketone-insoluble matter and toluene swelling index. Furthermore, the obtained pellets (including Comparative Example 8) were subjected to injection molding to form test pieces. The test pieces were measured for Charpy impact strength. Furthermore, total luminous transmittance, diffusion rate and yellow index were measured as follows. A sheet molded article was produced from the pellets by a sheet extruder of 40 mm φ and L/D=28. To obtain the sheet molded article of 2 mm in thickness, extrusion was formed by controlling the lip opening, the clearance of a polishing roll and haul-off speed and setting the temperatures of an extruder and a die at 220 to 230° C. From the obtained sheet molded article, test pieces were cut out and subjected to measurements. The measurement results are shown in Tables 3 and 4.

Examples 1 to 5

In Examples 1 to 5, the yellow indexes of transmitted light are low. Total luminous transmittance, light diffusibility and impact resistance are excellent.

Comparative Examples 1 to 7

In Comparative Examples 1 to 7, the yellow indexes of the transmitted light are high. Thus, the quality is low. In addition, Comparative Example 6 is inferior in light diffusibility.

Comparative Example 8

In Comparative Example 8, although the yellow index of transmitted light is low, impact resistance is bad.

TABLE 1

| | Example 1 | Example 2 | Example 3 | Example 4 | Example 5 |
|---|---|---|---|---|---|
| Rubber-modified styrene-based resin H1 | 100 | — | — | 30 | — |
| Rubber-modified styrene-based resin H2 | — | 100 | — | — | — |
| Rubber-modified styrene-based resin H3 | — | — | 100 | — | — |
| Rubber-modified styrene-based resin H4 | — | — | — | — | 30 |
| GP polystyrene-resin G1 | 0 | 0 | 0 | 70 | 70 |

*Unit of numerical values in the table is parts by weight.

TABLE 2

| | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Rubber-modified styrene-based resin H5 | 100 | 70 | — | — | — | 50 | — | — |
| Rubber-modified styrene-based resin H6 | — | — | 100 | — | — | — | 30 | — |
| Rubber-modified styrene-based resin H7 | — | — | — | 100 | — | — | — | — |
| Rubber-modified styrene-based resin H8 | — | — | — | — | 100 | — | — | — |

TABLE 2-continued

|  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Diffusing agent K1 | — | — | — | — | — | — | — | 3.0 |
| GP polystyrene-resin G1 | 0 | 30 | 0 | 0 | 0 | 50 | 70 | 100 |

*Unit of numerical values in the table is parts by weight.

TABLE 3

|  | Example 1 | Example 2 | Example 3 | Example 4 | Example 5 |
|---|---|---|---|---|---|
| Content of rubber-like polymer (wt %) | 8.4 | 8.6 | 5.4 | 2.5 | 2.5 |
| Dispersion-particle diameter (μm) | 1.3 | 2.7 | 2.0 | 1.3 | 1.3 |
| Particle diameter distribution | 1.2 | 1.4 | 1.2 | 1.2 | 1.2 |
| Methylethylketone-insoluble matter (wt %) | 18.2 | 17.6 | 13.5 | 5.5 | 5.4 |
| Swelling index to toluene | 7.0 | 7.3 | 7.3 | 7.0 | 10.6 |
| Ps/Ru ratio of dispersion phase | 1.2 | 1.0 | 1.5 | 1.2 | 1.2 |
| Total luminous transmittance (%) | 44 | 47 | 47 | 54 | 55 |
| Light diffusion rate (%) | 91 | 89 | 88 | 73 | 69 |
| Yellow Index (Y.I.) | 5.9 | 5.5 | 3.9 | 5.8 | 6.3 |
| Charpy impact strength (kJ/m$^2$) | 12.2 | 7.7 | 5.1 | 4.0 | 5.2 | equipment and light advertising display, liquid crystal display devices such as liquid crystal display and liquid crystal television and produced into various types of molded articles by molding methods such as extrusion molding, injection molding and compression molding. Of them, the rubber-modified styrene-based resin can be suitably used as a direct-type back-light-diffusion plate of a liquid crystal device.

Figure 1:
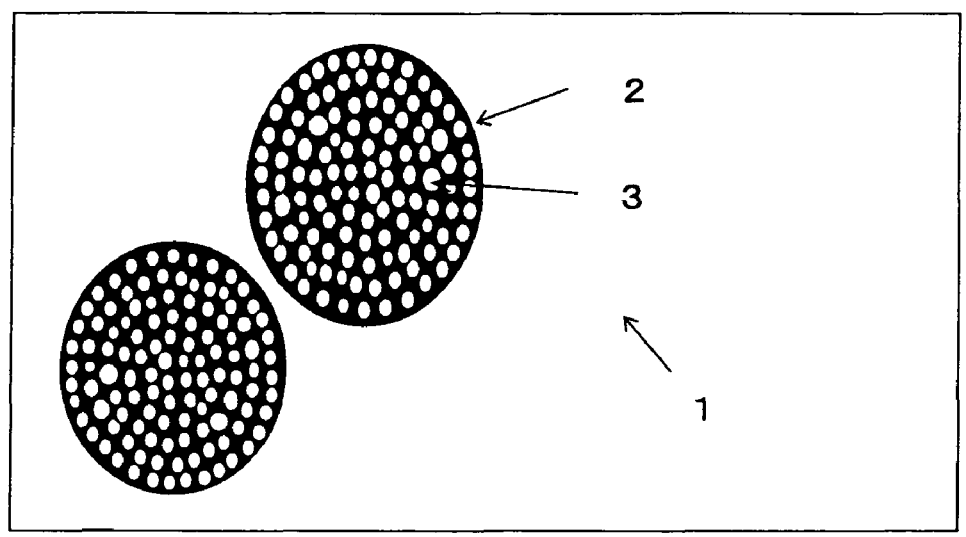
FIG. 1 is a schematic cross sectional view for illustrating a islands-sea structure of rubber-like polymer particles, where reference numeral 1 indicates a styrene-based polymer serving as a matrix; reference numeral 2 indicates rubber-like polymer (particles) dispersed in the matrix; and reference numeral 3 indicates styrene-based polymer 3 contained in the rubber-like polymer particle.

The invention claimed is:
1. A rubber-modified styrene-based resin comprising a styrene-based polymer forming a matrix and rubber-like polymer particles dispersed in the matrix like islands, each of the

TABLE 4

|  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Content of rubber-like polymer (wt %) | 4.3 | 3.0 | 8.0 | 6.5 | 8.4 | 2.2 | 2.4 | — |
| Dispersion-particle diameter (μm) | 2.3 | 2.3 | 1.2 | 7.7 | 0.8 | 2.3 | 1.2 | — |
| Particle diameter distribution | 1.8 | 1.8 | 1.2 | 3.0 | 1.1 | 1.8 | 1.2 | — |
| Methylethylketone-insoluble matter (wt %) | 15.9 | 11.1 | 24.0 | 19.2 | 17.9 | 8.1 | 7.3 | — |
| Swelling index to toluene | 9.2 | 9.0 | 9.1 | 7.6 | 7.9 | 9.1 | 9.0 | — |
| Ps/Ru ratio of dispersion phase | 2.7 | 2.7 | 2.0 | 2.0 | 1.1 | 2.7 | 2.0 | — |
| Total luminous transmittance (%) | 44 | 48 | 43 | 60 | 39 | 53 | 54 | 53 |
| Light diffusion rate (%) | 88 | 78 | 91 | 62 | 91 | 60 | 68 | 73 |
| Yellow Index (Y.I.) | 13.8 | 11.5 | 17.2 | 14.5 | 17.1 | 11.4 | 11.5 | 4.8 |
| Charpy impact strength (kJ/m$^2$) | 12.8 | 10.8 | 13.1 | 6.2 | 7.6 | 8.6 | 5.0 | 1.8 |

INDUSTRIAL APPLICABILITY

The rubber-modified styrene-based resin of the present invention can be suitably used as a molding material for light rubber-like polymer particles having a cross sectional structure where the styrene-based polymer particles are contained like islands-sea, wherein the rubber-modified styrene-based resin is constituted of 1-10 wt % of the rubber-like polymer and 99-90 wt % of the styrene-based polymer; the particle-diameter of the rubber-like polymer particle falls within a range of 1.0 to 5.0 µm; and a value of (styrene-based polymer weight/rubber-like polymer weight) in a methylethylketone-insoluble matter of the rubber-modified styrene-based resin falls within a range of 0.5 to 1.5.

2. The rubber-modified styrene-based resin according to claim 1, wherein a particle-diameter distribution of the rubber-like polymer particles of the rubber-modified styrene-based resin falls within a range of 1.0 to 1.6.

3. The rubber-modified styrene-based resin according to claim 1 or 2, wherein a swelling index of toluene-insoluble matter of the rubber-modified styrene-based resin to toluene falls within a range of 5.0 to 10.0.

4. A light diffusion plate comprising at least one layer formed of the rubber-modified styrene-based resin according to claim 1.

* * * * *